(12) United States Patent
Enger (10) Patent No.: US 12,535,151 B2
(45) Date of Patent: Jan. 27, 2026

(54) VALVE LOCKOUT

(71) Applicant: Brady Worldwide, Inc., Milwaukee, WI (US)

(72) Inventor: Andrew N. Enger, Muskego, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 137 days.

(21) Appl. No.: 17/867,925

(22) Filed: Jul. 19, 2022

(65) Prior Publication Data

US 2024/0026991 A1    Jan. 25, 2024

(51) Int. Cl.
*F16K 35/10* (2006.01)
*E05B 67/00* (2006.01)
*E05B 67/38* (2006.01)

(52) U.S. Cl.
CPC ............ *F16K 35/10* (2013.01); *E05B 67/003* (2013.01); *E05B 67/383* (2013.01)

(58) Field of Classification Search
CPC ........ F16K 35/10; F16G 11/14; E05B 67/003; E05B 67/02; E05B 67/38; E05B 67/383; E05B 65/0089; E05B 73/0005; E05B 73/0041
See application file for complete search history.

(56) References Cited

U.S. PATENT DOCUMENTS

| | | | | |
|---|---|---|---|---|
| 3,765,061 A | * | 10/1973 | Nash | A43C 7/08 24/134 P |
| 4,033,156 A | * | 7/1977 | Cottingham | E05B 17/002 174/67 |
| 5,845,809 A | * | 12/1998 | Garrett | F16K 35/10 220/728 |
| 6,371,155 B1 | * | 4/2002 | Balocca | E03C 1/041 137/382 |
| 8,074,960 B2 | | 12/2011 | Milbeck et al. | |

(Continued)

FOREIGN PATENT DOCUMENTS

CN    107476680 A  * 12/2017   ............. B65D 23/00

OTHER PUBLICATIONS

Brady, "Plug Valve Lockout—1.375" Valve Stem Diameter," Part No. 113232, Retrieved Jul. 25, 2022, from: https://www.bradyid.com/lockout-tagout/plug-valve-lockout-1375-valve-stem-diameter-pid-113232, 4 pages.

(Continued)

*Primary Examiner* — Christine M Mills
*Assistant Examiner* — Peter H Watson
(74) *Attorney, Agent, or Firm* — Quarles & Brady LLP (57) ABSTRACT

A lockout device can be used to secure a valve, a valve stem, or other control. The lockout device includes a cover having an internal cavity and an opening about the internal cavity, a cable that is flexible, a cable attachment point attached to the cover to which the cable is attached at its securable end, and a cable lockout module attached to the cover. The cable lockout module includes a cable engagement element having a cable-receiving pathway extending therethrough for reception of a free end of the cable and selective securement thereof to create a cable loop. The cable lockout module further has a door. When the door is in a closed position, the cable engagement element is securely covered by the door and the door is lockable relative to a remainder of the cable lockout module to prevent the door from being opened.

21 Claims, 7 Drawing Sheets

(56) References Cited

U.S. PATENT DOCUMENTS

| | | | |
|---|---|---|---|
| 8,234,757 B2* | 8/2012 | Lesley | B60P 7/0823 24/68 CD |
| 8,347,671 B2 | 1/2013 | Brojanac et al. | |
| 2006/0283215 A1 | 12/2006 | Manthe et al. | |
| 2007/0240766 A1 | 10/2007 | Brojanac et al. | |
| 2015/0315822 A1 | 11/2015 | Garthe et al. | |

OTHER PUBLICATIONS

Masterlock, "Seal Tight™ Ball Valve Lockout," Product No. 468L, Retrieved Jul. 25, 2022, from: https://www.masterlock.com/products/product/468L, 7 pages.

U.S. Appl. No. 17/559,532, titled Clamping Cable Lockout, naming inventors Enger et al., filed Dec. 22, 2021, 58 pages.

U.S. Appl. No. 17/696,449, titled Cable Lockout Device, naming inventors Enger et al., filed Mar. 16, 2022, 65 pages.

U.S. Appl. No. 63/356,800, titled Multicable Lockout Device, naming inventors Enger et al., filed Jun. 29, 2022, 36 pages.

European Patent Office, Extended European Search Report, Application No. 23186109.7, Nov. 30, 2023, 8 pages.

\* cited by examiner

FIG. 9

VALVE LOCKOUT

CROSS-REFERENCE TO RELATED APPLICATION

Not applicable.

TECHNICAL FIELD

This disclosure relates to a lockout device having a cover that is secured over a control, for example a valve or valve stem, using a cable loop that is secured using a cable lockout module on the cover.

BACKGROUND

Lockout devices are conventionally used to secure controls or energy isolation points during the maintenance or servicing of equipment. For instance, if a particular control or energy isolation point needs to be turned off to safely perform maintenance on equipment, then a lockout device may be installed on the control or the energy isolation point to physically prevent others from mistakenly turning that control back on until the work is complete.

Such lockout devices often include the ability for multiple users to lockout a control simultaneously, for example, by permitting each user to attach their own separate padlock to the lockout device to secure the lockout device in place on the control. In such case, the lockout device cannot be removed and the control operated until all the individual padlocks are removed from the lockout device.

Some lockout devices are designed for securing valves or valve stems after a turn handle has been removed. Such lockout devices exist and can be found, for example, in U.S. Pat. No. 8,074,960 to Brady Worldwide, Inc. The solution disclosed in that patent involved attaching a base of the lockout device to a valve stem by application of a hose clamp. With the base secured relative to the valve stem, a top cover could then be secured to that base in which the top cover could be locked to the base by way of a padlock. With the top cover secured in place, both the valve stem and the hose clamp remained inaccessible.

SUMMARY

However, such previous lockout device constructions for valves and valve stems involves multiple steps and tools for installation due to the hose clamp. Further, the design is predicated on fact that the valve stem is large enough to receive a hose clamp and that the hose clamp will remain secure enough around the valve stem to prevent the removal of the entire lockout device.

Disclosed herein is an improved solution for locking out valves, valve stems, and various other types of controls without limitation. Rather than employing a hose clamp to secure one part of the lockout assembly to the valve stem, in this new concept a cover can be placed over the valve stem and then a cable connected to the cover can be looped around the valve or pipe associated therewith to a cable lockout module attached to the cover. The other end of the cable can be received in the cable lockout module which can secure the free end of the cable to form a loop to secure the cover. In some forms, this cable lockout module could involve biased gripping cleats that permit the cable loop to be reduced in size when the cable is pulled in one direction through the cleats in the cable lockout module, but not enlarged, as the cable is clamped down upon and gripped when pulled in the loop-enlargement direction. The cable lockout module can have a lockable door that only permits the cable to be removed from the cable lockout module and the loop to be broken when the door to the cable lockout module is opened and not locked shut.

In this way, a lockout device could be quickly attached to a valve stem or other controls that could be covered by the cover/cup. Unlike the aforementioned solution, there is no need for the installation of a hose clamp, nor for tools such as a screwdriver or socket wrench that would be necessary to install and remove the hose clamp. Furthermore, the disclosed device can be highly adaptable, as a cable loop can be formed and tightened to accommodate variously sized valves and pipes. This construction can reduce the number of components that would need to be sized for the particular valve or control, as the cable loop is highly adjustable in terms of the size of the loop. Additionally, it reduces the number of separable components of the lockout device that could potentially be separated and lost with respect to one another (for example, it does not have a hose clamp apart from a base and cover which constitute at least three parts that are separate prior to installation).

According to one aspect, a lockout device is disclosed for securing a valve, a valve stem, or other control. The lockout device includes a cover having an internal cavity and an opening about the internal cavity. The internal cavity is for receiving at least a part of the valve, the valve stem, or the other control. The lockout device also includes a cable extending from a securable end to a free end in which is cable being flexible. The lockout device further includes a cable attachment point attached to the cover in which the cable is attached at the securable end of the cable to the cable attachment point. The lockout device additionally includes a cable lockout module attached to the cover. The cable lockout module includes a cable engagement element having a cable-receiving pathway extending therethrough for reception of the free end of the cable and selective securement thereof to create a cable loop between the cable attachment point and the cable lockout module. The cable lockout module further has a door movable between an opened position and a closed position in which the door provides access to the cable engagement element. When the door is in the closed position, the cable engagement element is securely covered by the door and the door is lockable relative to a remainder of the cable lockout module to prevent the door from being taken out of the closed position while locked.

In some forms, the cable attachment point and the cable lockout module may be positioned on different external sides of the cover such that the internal cavity of the cover is interposed between the cable attachment point and the cable lockout module.

In some forms, the opening about the internal cavity of the cover may have an insert positioned therein in which the insert is positioned about a periphery of the opening. The insert may be made from a material that is more compressible than a material of the cover. With such greater compressibility, the insert may be configured to conform to parts of the valve, the valve stem, or the other control or a pipe associated therewith when the lockout device is attached to it or them.

In some forms, the cable engagement element may include a pair of rotatable cleats having the cable-receiving pathway therebetween. The pair of rotatable cleats may each have tips biased toward the cable-receiving pathway. When the cable is received in the cable-receiving pathway between the pair of rotatable cleats, the cable may be able to be pulled in one direction to reduce a size of the cable loop formed between the cable attachment point and the cable lockout module but may not be able to be pulled in the opposite direction to increase the size of the cable loop. Each of the pair of rotatable cleats may be biased by a respective torsion spring.

In some forms, the cable attachment point may include a cable opening sized so that the free end of the cable is able to pass through the cable opening, but the securable end of the cable is too large to pass through the cable opening thereby permitting the cable to be secured to the cover by the engagement of the securable end with the cable opening of the cable attachment point.

In some forms, the door may be hinged relative to the remainder of the cable lockout module.

In some forms, the cable lockout module may have a tab with a plurality of lock openings and the door may have a slot for receiving the tab when the door is in the closed position. When the door is in the closed position, the plurality of lock openings may be on a side of the door opposite the cable engagement element. The plurality of lock openings may be sized to receive a shackle of a padlock to lock the door in the closed position.

In some forms, the cable lockout module may include peripheral walls surrounding the cable engagement element and the peripheral walls may include cable openings formed therein for accommodating passage of the cable therethrough.

According to another aspect, a method is disclosed of attaching the lockout device as described above or elsewhere herein to a valve, a valve stem, or other control to lock out the valve, the valve stem, or other control. The internal cavity of the cover is placed over at least part of the valve, the valve stem, or other control. The free end of the cable is wrapped around either the valve, a valve associated with the valve stem, or other control, or an associated pipe therewith. The free end of the cable is placed within the cable-receiving pathway of the cable engagement element to form the cable loop.

In some forms, the method may further include the door of the cable lockout module being closed and locking the door in the closed position to prevent a removal of the free end of the cable from the cable-receiving pathway of the cable engagement element, thereby preventing the cable loop from being broken. In some more specific forms yet, the cable may be pulled through the cable-receiving pathway of the cable engagement element to reduce the size of the cable loop.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Unless otherwise defined, the technical terms or scientific terms as used in the claims and the description should be construed in a generic meaning as understood by those of ordinary skill in the art to which the present invention pertains. The terms "first", "second", or the like as used in the description and claims of the patent application do not denote any order, quantity, or importance, but are merely used to distinguish different components. The terms "a", "an" or "the" like do not denote a quantity limitation but mean that there is at least one. The terms "include", "comprise" or the like mean that the elements or objects that precede "include" or "comprise" encompass the elements or objects and their equivalents that appear after "include" or "comprise" and do not exclude other elements or objects. The terms "connect", "connected" or the like are not limited to physical or mechanical connections, nor are they limited to direct or indirect connections.

Figure 1:
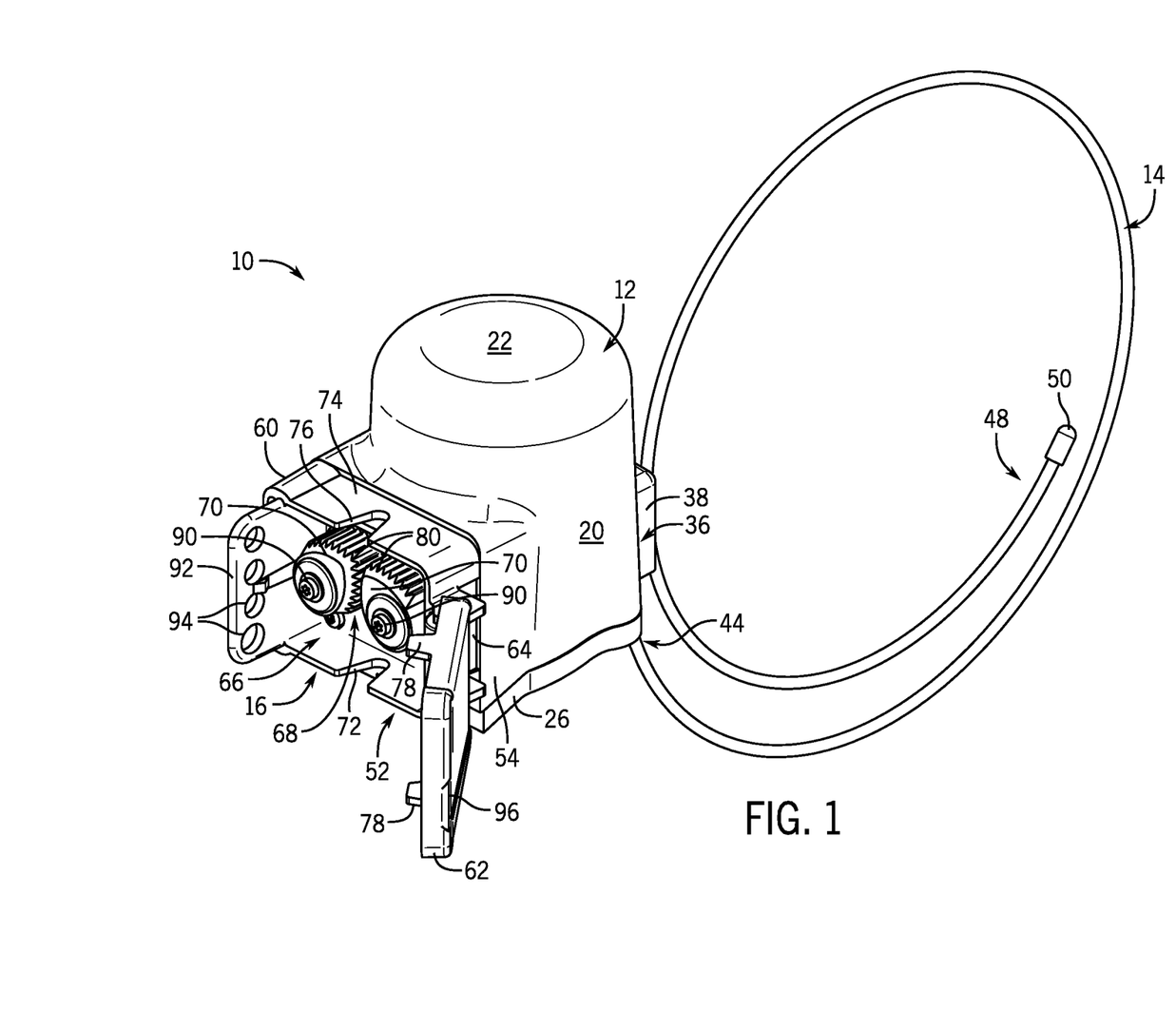
FIG. 1 is a front, right side, top perspective view of an exemplary lockout device with a door of the cable lockout module in an opened position to show the cable engagement element in the form of a pair of cleats and further having a cable shown without having been formed into a secured loop with the cable lockout module.

The terms "top", "bottom", "front", "rear", "left", "right", and so forth used herein are exemplary directions defined only for facilitating the description. For example, as shown in FIG. 1, the directions toward the reader are front, right, and top (given the perspective view) and the directions away from the reader are rear, left, and bottom. Of course, those skilled in the art would be able to understand that the directions such as "top", "bottom", "front", "rear", "left", and "right" can be defined in other ways, which also fall within the scope of protection of the present disclosure.

A structure having an "integral design" is a component formed from one piece of material, such as a molded piece. A structure having a "composite design" is a component formed from more than one distinct piece (or part), which upon assembly are combined.

Referring first to FIGS. 1 through 5, a lockout device 10 is illustrated such as a ball valve lockout for covering and securing a valve stem as will be illustrated stepwise in FIG. 6 through 9 below. This lockout device 10 is adaptable to cover nearly any control in which a cup-like cover might be applied over the control to limit the ability of users to operate that control and is easily installed.

With respect to the various parts of the lockout device 10, the lockout device 10 primarily includes a cover 12, a cable 14, and a cable lockout module 16.

Figure 3:
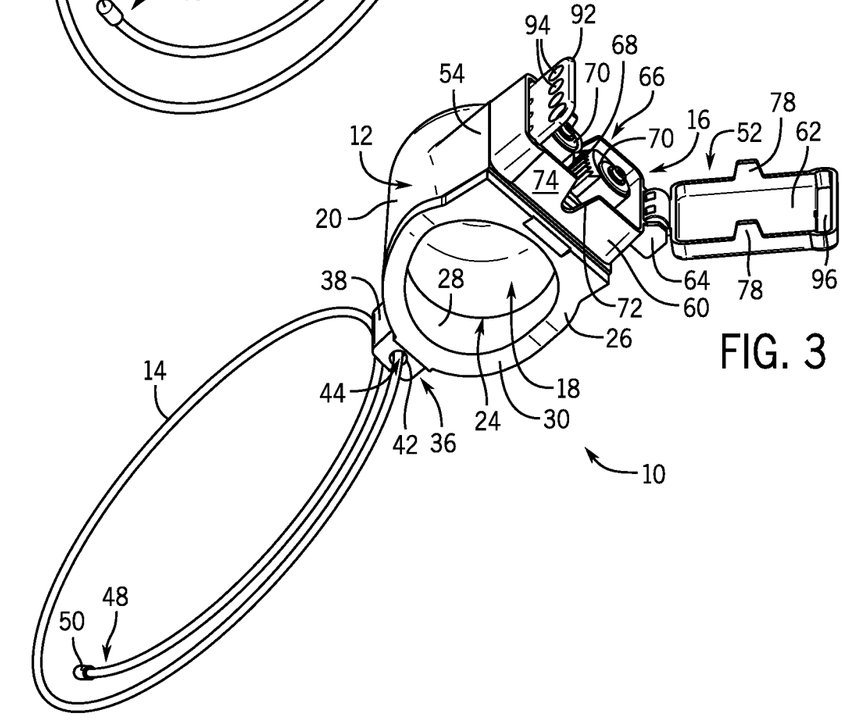
FIG. 3 is a bottom perspective view of the lockout device of FIG. 1 that better shows the internal cavity of the cover and the cable attachment point.

Looking at the cover 12, the cover 12 provides an internal cavity 18 that is best seen in FIG. 3. This internal cavity can receive part of the control during use of the lockout device 10. Again, and for example, that control might be at least part of a valve, a valve stem, or other control without limitation. The internal cavity 18 is defined by sidewalls 20 that extend upward to a top wall 22 as illustrated. In the form illustrated, the sidewalls 20 are generally cylindrically or tubular shaped with a transition between the sidewalls 20 and the top wall 22 forming a dome-like shape on the closed end of the internal cavity 18. On the opposite side of the top wall 22 as illustrated, the cover 12 has an opening 24 that defines the entrance to the internal cavity 18. When the cover 12 is applied over at least a part of a valve, a valve stem, or other control, the opening 24 is what initially receives this control as it enters the internal cavity 18.

Figure 5:
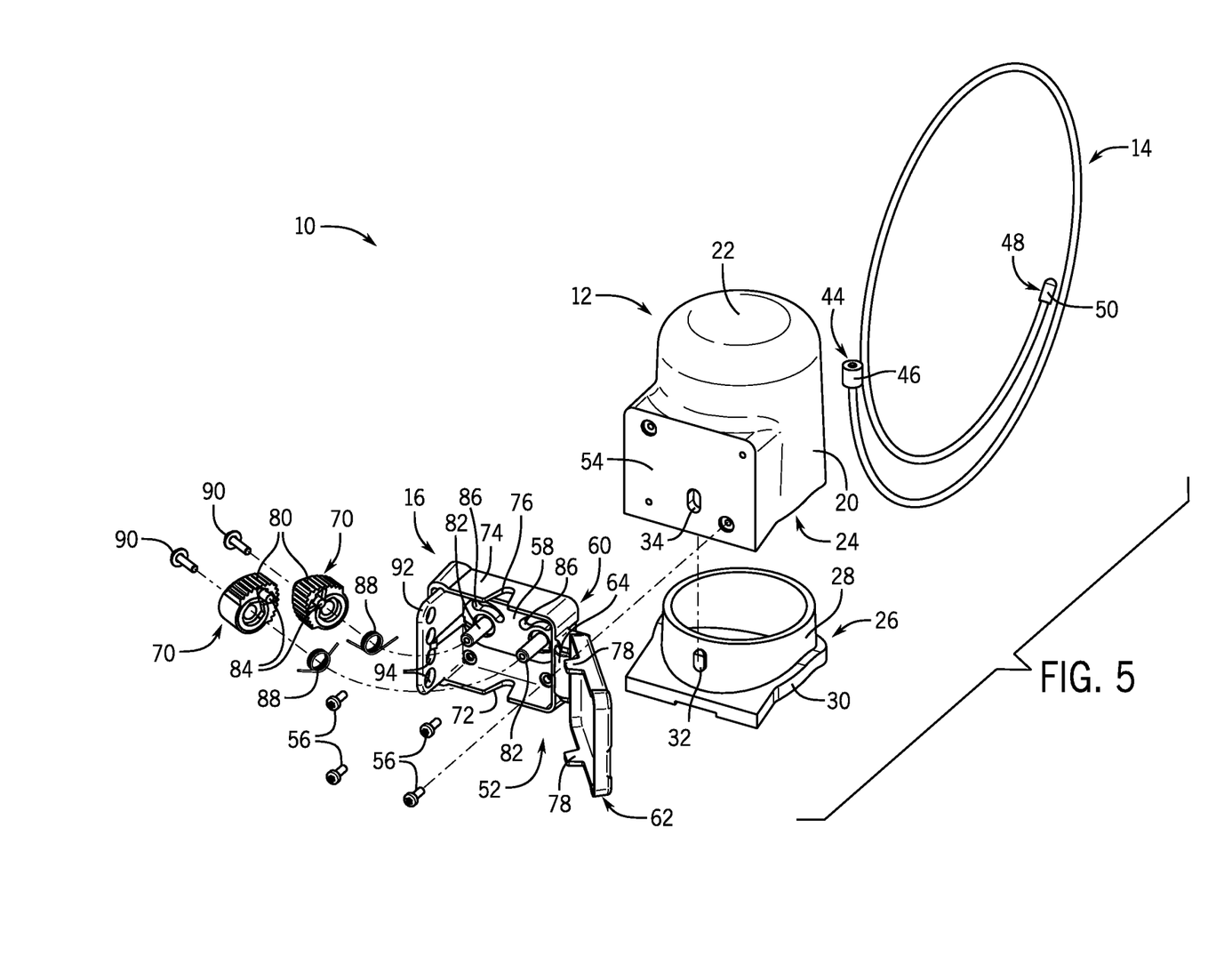
FIG. 5 is an exploded view of the lockout device as illustrated in FIG. 1 with the cable lockout module, insert, and cable exploded from the cover and the parts of the cable lockout module such as the rotatable cleats and biasing elements further exploded in in a book view.

As can be seen throughout the figures and is most apparent in the exploded view of FIG. 5, the cover 12 can have an insert 26 received in or about the opening 24 of the cover 12. If it is present, the insert 26 can be positioned about the periphery of the opening 24 the cover 12 so that the insert 26, rather than the edge of the opening 24 of the cover 12 contacts the control and/or the pipe associated therewith. In contemplation of this contact, the insert 26 can be made from a material that is more compressible than the material of the cover 12. For example, the cover 12 could be made from a metal or hard polymeric material (or combinations thereof) for structural strength, but the insert 26 could be made from a rubber, other elastomeric material, or a foam that is comparably more compressible. Such an insert 26 could be used to help avoid contact between two rigid elements at one or more of their edges where such contact could either damage or wear the edge of the cover 12 or the object to which the lockout device 10 is attached (for example, a valve or pipe). Additionally, where there is some compressibility in the insert 26, the insert 26 can conform to parts of the valve, the valve stem, or the other control or a pipe associated therewith when the lockout device 10 is attached.

While the insert 26 could take a number of forms and be attached to the cover 12 at the opening 24 in a number of ways, in the particular form illustrated and as seen in FIG. 5, the insert 26 has a generally tubular collar 28 for being inserted into the internal cavity 18 of the cover 12 and that collar 28 is attached to a skirt 30 or shoulder at the lower end of the collar 28 to cover the periphery of the opening 24 of the cover 12. While the transition between the collar 28 and the skirt 30 provides a shoulder that can abut the lower edge of the opening 24 of the cover 12 to help position the insert 26 within the internal cavity 18 and opening 24 of the cover 12, the insert 26 and cover 12 can have another complimentary structure to locate or position the two with respect to one another. For example, and as best seen in FIG. 5, the collar 28 has a radially-extending locating projection 32 that can be received in a mating slot 34 in the cover 12. The locating projection 32 and the mating slot 34 can be used to both position the insert 26 angularly and axially with respect to the internal cavity 18 of the cover 12.

While an insert 26 is described, such an insert 26 is completed as being an optional element of this lockout device 10 and might be omitted altogether. Regardless of whether an insert 26 is present or not, it is completed that the opening 24 of the cover 12 and insert 26 (if present) could be generally shaped to match the surfaces of the objects onto which the opening 24 and insert 26 (if present) will contact. For example, the lower extent of the cover 12 could have an arched or saddle-like shape if the cover 12 is being adapted to go over a pipe or valve so that it conforms to the shape of the object on which it is being received. Likewise, the lower extent of the cover 12 could be substantially flat, if for example, the cover 12 is being placed over a water fountain spigot.

The cover 12 includes a cable attachment point 36 on one side of the cover 12 and the cable lockout module 16 on the other side of the cover 12 and both are placed on an external surface of the sidewalls 20 of the cover 12. As depicted, since the opening 24 of the cover 12 is generally round, this means the centers of the cable attachment point 36 and the cable lockout module 16 are therefore approximately 180 degrees from one another about the central axis of the cover 12. As they are positioned on different external sides of the cover 12 as illustrated, this also results in the internal cavity 18 of the cover 12 being interposed or between the cable attachment point 36 and the cable lockout module 16. However, it is contemplated the cable attachment point 36 and the cable lockout module 16 could be differently placed, but to a similar effect in their ability to form a workable cable loop as described herein with respect to the functioning of the lockout device 10.

Figure 2:
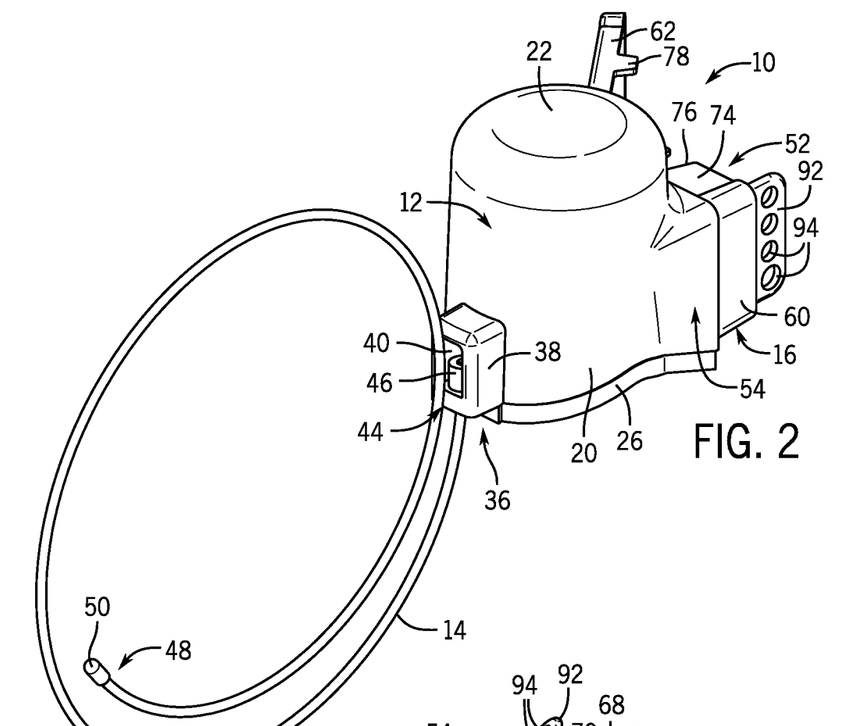
FIG. 2 is a rear, left side, top perspective view of the lockout device of FIG. 1 that better shows a cable attachment point on the rear of the cover.

Looking at the cable attachment point 36 and as best seen in FIGS. 2 and 3, the cable attachment point 36 provides a point of attachment for the cable 14. In the exemplary lockout device 10 shown, the cable attachment point 36 is a radially-projecting section 38 of the cover 12 that has a counter-projecting recessed opening 40 with a cable opening 42 formed in the bottom wall of the recessed opening 40. This cable opening 42 of the cable attachment point 36 is adapted to receive the cable 14 which is flexible and which cable 14 includes a securable end 44 with a stop or collar 46 and further includes a free end 48 having no such stop or collar (although the free end 48 may have a tip cover 50 which could be smaller in diameter than the collar 46 to permit passage through the cable opening 42 or which could be removed and re-attached from the free end 48 of the cable 14 by hand).

To install the cable 14 in the cable opening 42 of the cable attachment point 36, the free end 48 of the cable 14 is inserted through the recessed opening 40 into and through the cable opening 42 and is advanced until the securable end 44 of the cable 14 reaches the cable opening 42. At that point, the stop or collar 46 of the securable end 44 of the cable 14 is so large as to block the cable 14 from further passing through the cable opening 42. This thereby secures the cable 14 in the cable opening 42 and prevents the cable 14 from being separated from the cover 12 by further forward pulling of the cable 14. In this position, the collar 46 can be positioned within the recessed opening 40 as best seen in FIG. 2, such that the surrounding walls act as guard walls for the securable end 44 of the cable 14 and prevent a withdrawal of the cable 14 from the cable attachment point 36 by merely reverse feeding of the cable 14 as the collar 46 or securable end 44 would likely dead-end into one of the surrounding walls. Rather, a user would likely have to tilt the securable end 44 of the cable 14 to ensure that the cable 14 would clear those walls (if the cable 14 was to be removed for replacement, for example).

It will be appreciated that while the figures depict cable 14 with a stop or collar 46 securable to the cable opening 42 of the cable attachment point 36, the cable 14 could alternatively be fastened (such as with a screw), or otherwise connected to the cover 12 at the cable attachment point 36. In some embodiments, the cable 14 may be replaceable with another cable for any one of several reasons (such as, for example, cable wear, replacing the cable with a cable of a different diameter or material, and so on). A nonlimiting example of a suitable cable 14 is a nylon and/or polyvinyl chloride (PVC) coated steel cable. Still further, it will be appreciated that while the cable attachment point 36 is illustrated as being integrally attached with the cover 12, that the cable attachment point 36 or associated structure could be attached to the cover 12 as part of a composite construction.

Figure 8:
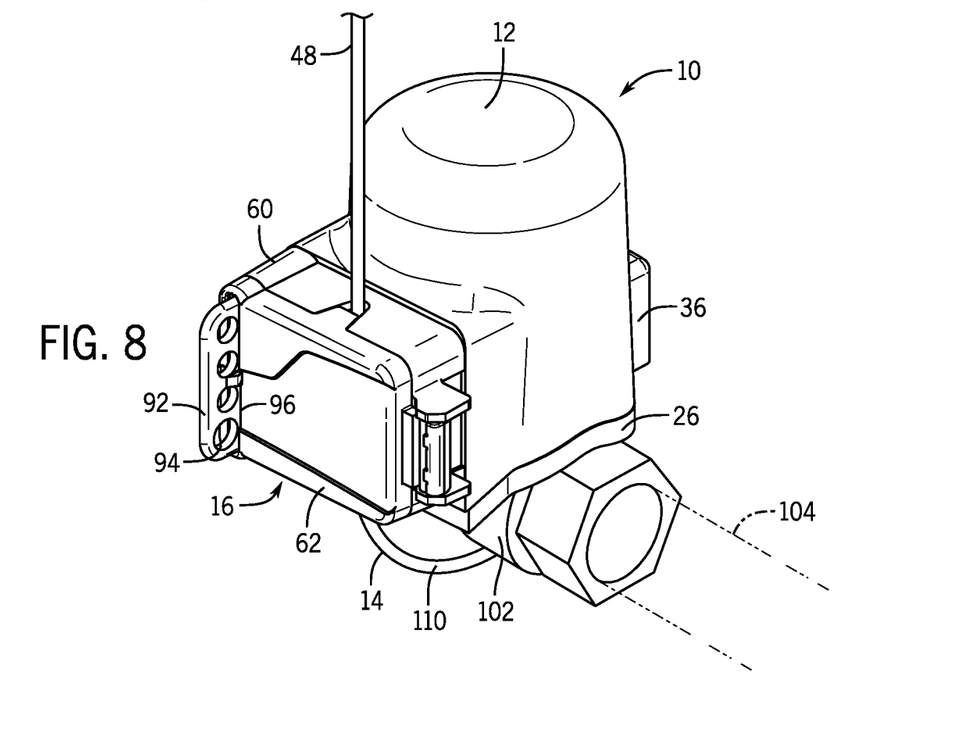
FIG. 8 illustrates the lockout device as attached to the valve stem of FIG. 7 after the door of the cable lockout module has been closed.
Figure 9:
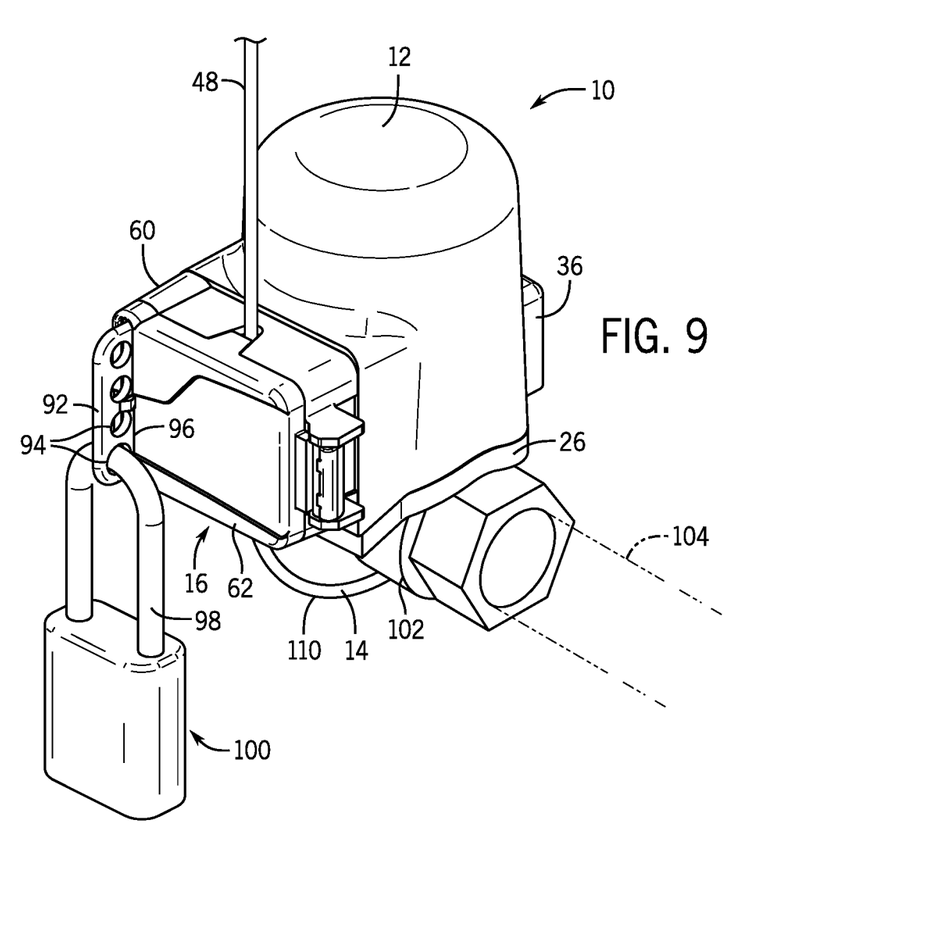
FIG. 9 illustrates the lockout device as attached to the valve stem as in FIG. 8 with the door of the cable lockout module closed, and further having a padlock attached that locks the door in the closed position to securely lock out the valve.

Turning now to the cable lockout module 16, the cable lockout module 16 in the form illustrated includes a housing 52 that is part of a composite construction and screwed to a mounting platform 54 on the sidewalls 20 of the cover 12 using screws 56. More specifically, the screws 56 attach a base wall 58 of a base 60 of the cable lockout module 16 to the mounting platform 54 of the cover 12 as shown in FIG. 5. While such a composite construction is used in the illustrated exemplary embodiment, it is contemplated that the cable lockout module 16 could be integrally formed with the cover 12 except for the movable parts. In any event, the housing 52 includes portions including the base 60 and a door 62 in which the door 62 is connected to the base 60 on a side thereof by a hinge 64. As depicted in FIGS. 1 through 7, the door 62 is opened relative to the base 60, but the door 24 could be closed as is illustrated in FIGS. 8 and 9.

In the form illustrated, the hinge 64 connects the base 60 to the door 62 to provide the movability of the door 62 with respect to the base 60. The hinge 64 as shown includes a pair of hinge parts disposed on the right side of the base 60 relative to the orientation of the device 10 in the figures. One of the hinge parts is an integral part of the base 60 and provides a pin portion for the hinge 64. The other one of the hinge parts is an integral part of the door 62 and provides a C-shaped portion for the hinge 64. The C-shaped portion is snappable onto a forward-facing section of the pin portion when the door 62 is opened sufficiently with respect to the base 60 to connect the pin portion and the C-shaped portion together and to establish the mechanical connection of the hinge 64. When the door 62 is closed relative to the base 60 as is depicted in FIGS. 8 and 9, the C-shaped portion rotates with the movement of the door 62 to a rearward side of the pin portion (again relative to the orientation of the device 10 on the page) such that the hinge 64 cannot be separated by unsnapping the hinge parts from one another when the door 62 is closed, as attempting to move the C-shaped portion away from the pin portion is prevented by the interference of the door 62 and the base 60 in this closed position.

It is contemplated that the door 62 could be movable relative to the base 60 in other ways, whether hinged or not. The hinged arrangement particularly depicted in the figures is merely provided as one exemplary way of creating a hinged or movable connection between the sections of the cable lockout module 16 to limit access to a cable engagement element 66 supported by the base 60 and containable within the housing 52. Again, it is envisioned the hinge or connection between the base 60 and the door 62 could take other forms, while providing the same functionality with respect to the movability of the door 62 with respect to the base 60. It is contemplated that, in some forms, the hinge 64 as depicted could be replaced by a living hinge and thereby make the base 60 and the door 62 one continuous solid body having an integral design.

The cable lockout module 16 also includes a cable engagement element 66 having a cable-receiving pathway 68 extending through the cable engagement element 66 for reception of the free end 48 of the cable 14 and selective securement of the cable 14 to create a cable loop between the cable attachment point 36 and the cable lockout module 16. The best unobstructed view of this cable-receiving pathway 68 extending through the cable engagement element 66 can be seen in FIG. 4. In the exemplary embodiment, the cable engagement element 66 includes a pair of rotatable cleats 70 having the cable-receiving pathway 68 extending between them in which the cable-receiving pathway 68 extends from a cable entrance opening 72 at a lower end of a peripheral sidewall 74 of the base 60, between the pair of rotatable cleats 70, and to a cable exit opening 76 at an upper end of the peripheral sidewall 74 of the base 60. In the form illustrated, the cable entrance opening 72 and the cable exit opening 76 are rounded V-shaped groves formed through the peripheral sidewall 74 of the base 60 and corresponding truncated teeth 78 are formed on peripheral walls of the door 60 to closely retain the cable 14 in place in the cable entrance opening 72 and the cable exit opening 76 when the door 62 is closed.

Looking more specifically at the pair of rotatable cleats 70, the pair of rotatable cleats 70 are teardrop-shaped, extending to a corresponding tip 80. Each of the cleats 70 are rotatably mounted to a corresponding post 82 that extending forwardly and perpendicularly from the base wall 58 of the base 60 as seen in FIG. 5 and also defines the axis of rotation of the respective cleat 70 received thereon. To define the angular range of motion of the cleats 70, each of the cleats 70 have a guidance peg 84 that extend from a back axial face thereof to engage a corresponding guidance slot 86 formed in the base wall 58 in which the guidance slot 86 is shaped like an arc. One of ordinary skill in the art will appreciate that the guidance slots 86 and the guidance pegs 84 could be oppositely arranged on the components to similar effect. For instance, guidance pegs could extend outwardly from the base wall and engage guidance slots formed on a facing side of the rotatable cleat.

Figure 4:
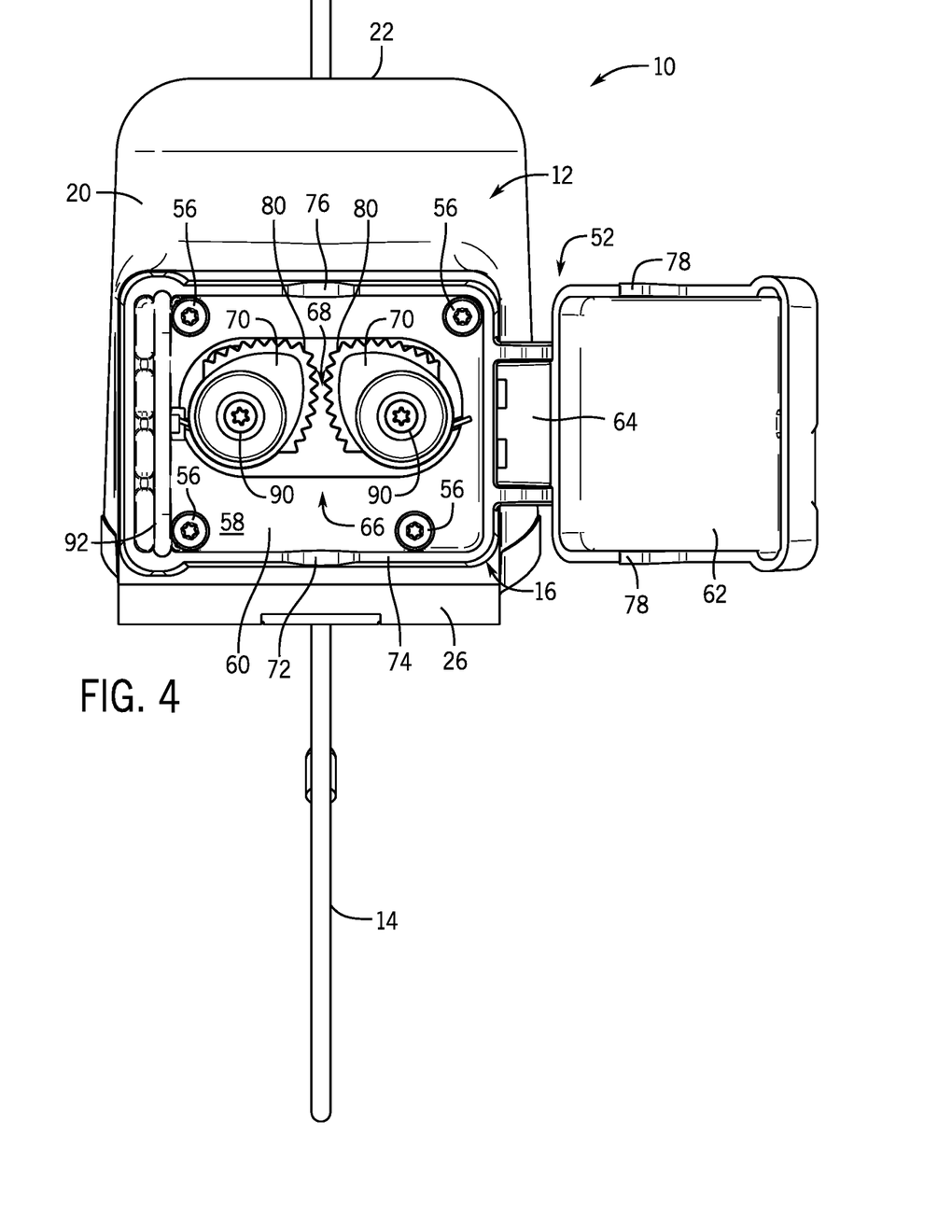
FIG. 4 is a front plan view of the lockout device of FIG. 1 showing the cable lockout module in greater detail and the pair of cleats that form the cable engagement element in the exemplary embodiment.

A corresponding torsion spring 88 with legs is coaxially interposed between each of the posts 82 and the cleats 70 in such a way that one of the legs of each of the torsion springs 88 engage a recess or other feature in the base wall 58 and the other of the legs engages a feature on the cleat 70. So configured, the leftmost cleat 70 in FIG. 4 is biased to rotate in the clockwise direction, while the rightmost cleat 70 FIG. 4 is biased to rotate in the counterclockwise direction. As the cleats 70 have tips 80 on the upper side of FIG. 4 that are each respectively pointed at the cable-receiving pathway 68, the biasing action of the springs 88 draws the tips 80 of the cleats 70 together at the cable-receiving pathway 68. This entire sub-assembly of the cleats 70 and springs 88 on the posts 82 is maintained by the use of fasteners 90 which axially attach and retain the cleats 70 to their respective posts 82 while also capturing the springs 88 between the cleats 70 and posts 82 as part of the sub-assembly and also still permitting the rotation of the cleats 70 on their rotational axes defined by the posts 82 and delimited by the guidance pegs 84 and the guidance slots 86.

With this construction, when the free end 48 of the cable 14 is placed in the cable-receiving pathway 68, the free end 48 of the cable 14 is able to be pulled upward through the cable-receiving pathway 68, but not downward in the reverse direction. This results in an overall construction in which, when the securable end 44 of the cable 14 is attached to the cable attachment point 36 and when the cable 14 is prevented from being removed from and is retained in the cable-receiving pathway 68, then the cable loop formed between the cable attachment point 36 and the cable lockout module 16 (both of which are attached to the cover 12 which "closes" this loop) can only be reduced in size, but not expanded or enlarged, due to the one-way gripping action of the cable engagement element 66 (the cleats 70 in particular in the exemplary embodiment). For example, the free end 48 of the cable 14 can be pulled upward relative to the orientation of FIG. 4 to reduce the size of a cable loop, but not downward without being pinched and held by the converging tips 80 of the cleats 70.

To prevent the cable 14 from being removed from the cable receiving pathway 68 of the cable engagement element 66 by pulling the cable 14 forward and out of the cable receiving pathway 68 to disengage the cable 14 from the cable engagement element 66, the door 62 to the cable lockout module 16 can be closed, thereby preventing user access to the cable 14 in the cable-receiving pathway 68. When the door 62 is closed, the door 62 itself can cover the cable engagement element 66 and, furthermore, the truncated teeth 78 on the door 62 can further enter and reduce the size of the cable entrance opening 72 and the cable exit opening 76 to create a closed or fully encircled opening at each location, but such in way that still permits passage of the cable 14 through the cable entrance opening 72 and the cable exit opening 76 in the axial direction of the cable 14 (at least in as much as the cable engagement element 66 permits such motion, which is restricted to no more than one direction and might be no permitted motion).

To facilitate a locking of the door 62 in the closed position, the base 60 of the cable lockout module 16 has a tab 92 that projects forwardly with at least one or a plurality of lock openings 94 in which the tab 92 is located on a side of the base 60 opposite the hinge 64. In the figures as depicted, the tab 92 is located on the left side of the cable lockout module 16. The door 62 has a corresponding slot 96 that receives the tab 92 when the door 62 is closed such that, with the door 62 closed, the lock openings 94 are on a side of the door 62 opposite the cable engagement element 66. In such case, when the door 62 is closed, and a shackle 98 of a padlock 100 (see FIG. 9) or other locking element is put through one or more of the lock openings 94 of the tab 92, the connection at the hinge 64 and the presence of any padlock 100 or other locking element prevents the door 62 from being opened past the padlock 100 or locking element secured to the tab 92 until all locking elements have been removed, thereby restricting access to the cable engagement element 66 and preventing the release of the cable 14 to break the loop.

It is understood that while the exemplary embodiment as illustrated depicts a tab 92 with four lock openings 94, the tab may alternatively include a single lock opening, or two or more lock openings. In an embodiment, the tab includes from 1, or 2 to 3, or 4, or 5, or 6, or 8 lock openings. In another embodiment, the tab includes from 1 to 6, or from 2 to 6, or from 2 to 4 lock openings. Each of the lock openings may have the same size, or may have a different size than the other lock openings; wherein the size of the lock opening is the diameter of the lock opening 128.

At this point, while an exemplary structure has been described, it should be understood that the lockout device is not so limited to the specific structures illustrated. For example, while a pair of rotatable cleats are illustrated as being the cable engagement element, other constructions are certainly possible. For example, one cleat may be fixed and one rotatable to obtain a similar one-way gripping result. Still further, the cable engagement element might not permit one-way tightening of the cable, but rather just securely grip the free end of the cable at a location (for example, by a pinching, clasping, or clamping mechanism) that cannot be adjusted or the cable released therefrom as long as the door is closed. Likewise, numerous variations to the structure could be made such as the mechanism for locking the door in a closed position. For example, a tab with openings and a slot need not be used and there could be aligned openings found on each of a base and the door that receive a locking element, for example. Still further, the hinge could be differently constructed to the hinge depicted. Moreover, the specific geometries illustrated of the components could be modified. For example, the cover need not be generally cylindrically shaped but could be rectangular, cuboid, polygonal, semi-circular domed and so forth. Likewise, the cable lockout module could be differently shaped and, instead of being rectangular, could be square, rectangle, trapezoid, triangle, pentagon, oval, circle, semi-circle, and so forth.

With the lockout device 10 having been structurally described, the general operation of the device 10 in a lockout application will be described with respect to FIGS. 6 through 9.

Figure 6:
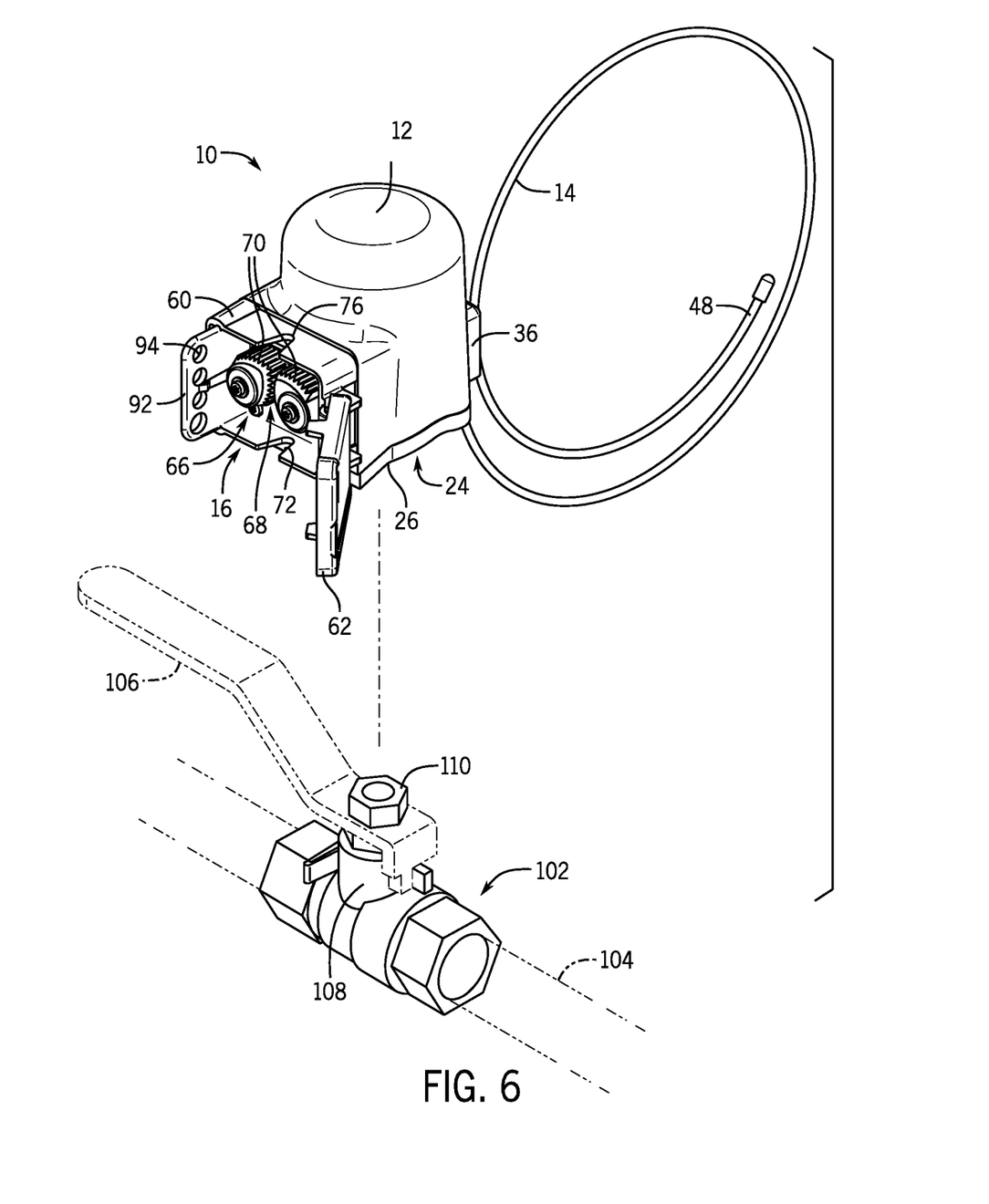
FIG. 6 illustrates the lockout device of FIG. 1 positioned above a handle with a handle shown in dashed lines to indicate that the handle can be removed from the valve stem before attachment of the lockout device.

Looking first at FIG. 6, a ball valve 102 is shown that will be locked out by the lockout device 10. The ball valve 102 is typically attached along a pipe 104 (shown in dashed lines in FIG. 6) and has a turn handle 106 that can be used to operate the valve 102. This turn handle 106 be removed from a valve stem 108 of the valve 102 by loosening and reattaching a nut 110, for example to reduce the size of the valve 102 to be covered. That is to say, given the size of the handle 106, the handle 106 can be removed prior to the subsequent attachment of the lockout device 10 so that the cover 12 only needs to cover the valve stem 108 and not the valve stem plus the turn handle 106. In the sequence illustrated from FIGS. 6 to 9, the turn handle 106 is first removed, which is why the turn handle 106 is shown in dashed lines.

While FIGS. 6 through 9 illustrate the attachment of the lockout device 10 as being attached to lock out the valve stem of a ball valve, it will be appreciated that similar attachment could be mad to lockout out other valve controls such as a quarter-turn ball valve handle, a butterfly handle, a gate valve handle, a three-way valve handle, a four-way valve handle, a five-way valve handle, a T-handle, or a ring handle and so on, thereby preventing the handle from being inadvertently moved and/or the valve from being operated. In some instances, the handle may be able to remain on the valve and in others, it may be removed. Still further, the control not be limited to just valves but any control that could be covered to secure it from being operated.

Figure 7:
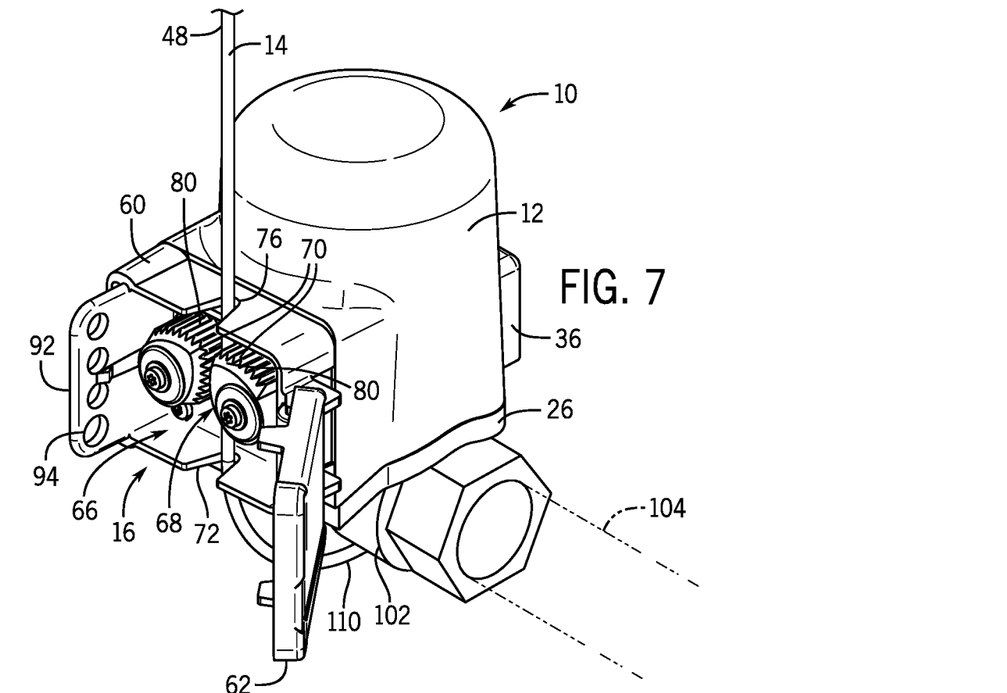
FIG. 7 illustrates the cover of the lockout device of FIG. 1 being placed on the valve stem of FIG. 6 after the handle of the valve has been removed and with the cable having been looped around the valve and/or pipe to extend through the cable lockout module and received in a cable-receiving pathway between the rotatable cleats.

Looking now at FIG. 7, the lockout device 10 is illustrated after the internal cavity 18 of the cover 12 has been placed over the valve stem 108 after the handle 106 has been removed. In this position, the lower surface of the insert 26 contacts the upper surface of the valve body of the valve 102 to cushion and/conform to the valve body. Furthermore, the free end 48 of the cable 14 is wrapped around either the valve 102 and/or the associated pipe and is placed within the cable-receiving pathway 68 of the cable engagement element 66 (which, as specifically embodied, is the cleats 70). In such placement of the cable 14, the cable 14 also enters the cable engagement element 66 at the cable entrance opening 72 before extending through the cable-receiving pathway 68 and out of the cable exit opening 76. As illustrated, the free end 48 of the cable 14 can be pulled upward to tighten and reduce the size of the cable loop 110, but not downward to enlarge the size of the cable loop 110, as the tips 80 of the cleats 70 would rotate together to pinch the cable 14 in that direction of pull. Thus, as long as the cable 14 remains within the cable-receiving pathway 68, the cover 12 can be more tightly secured to the valve 102 and pipe 104, but not removed from them or loosened unless the cable 14 is removed from the cable-receiving pathway 68 by pulling it forward out of the cable engagement elements 66.

Looking now at FIGS. 8 and 9, the door 62 of the cable lockout module 16 can be closed with the cable 14 in place as depicted in FIG. 8. Then, as depicted in FIG. 9, the door 62 can be locked in the closed position to prevent removal of the free end 48 of the cable 14 from the cable-receiving pathway 68 of the cable engagement element 66. Accordingly, the door 62 being locked prevents the cable loop 110 from being broken and secures the cable loop 110 and valve 102 (or other control) until the padlock 100 is removed. In some instances, if the cable loop 110 is loose initially then, after the door 62 is locked, the free end 48 of the cable 14 may be further pulled to reduce the size of the cable loop 110 and draw the cable 14 taut, even with the door 62 locked closed. Such functionality can be provided with the disclosed clamping cleat arrangement, but this functionality might not be available in other cable engagement mechanisms such as, for example, if the cable engagement mechanism simply clamps down on the cable at a single point using compressive jaws without a one-way gripping and one-way advancement structure. It will be noted that as depicted in FIGS. 7 through 9, that the cable 14 has slightly more slack than would likely be drawn out by the pulling action of the free end 48 taut.

It will be appreciated that there are or may be multiple lock openings 94 and so multiple locking mechanisms could be potentially secured to the cable lockout module 16 by various users to provide a multi-user lockout device. Not until all the locking mechanisms are removed can the door 62 be opened and the cable 14 removed to from the cable-receiving pathway 68 of the cable lockout module 16 so as to break the cable loop 110 and permit the lockout device 110 to be removed from the valve 102 or other control.

There may be variations to the described method of attachment. For example, while the cable 14 is shown pre-fed through the cable lockout module 16 in FIGS. 7 through 9, in some forms of the device 10, the door 62 might be closed and then, after the door 62 is closed, then the cable 14 may be introduced into and fed through the cable lockout module 16. Although if this use modality exists, then there may be some further internal structure within the housing 52 to help guide the cable 14 through the openings 72 and 76 and inside of the housing 52 when the door 62 is shut. Still further, when the cable engagement element 66 varies from the cleats 70 depicted, then the process of attachment and cable engagement may be varied from that described and adapted in accordance with the manner in which the cable engagement element 66 is designed to engage the cable 14.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A lockout device for securing a valve, a valve stem, or other control, the lockout device comprising:
   a cover having an internal cavity and an opening about the internal cavity, the internal cavity for receiving at least a part of the valve, the valve stem, or the other control;
   a cable extending from a securable end to a free end, the cable being flexible;
   a cable attachment point attached to the cover, the cable being attached at the securable end of the cable to the cable attachment point; and
   a cable lockout module attached to the cover, the cable lockout module including a cable engagement element contained therewithin in which the cable engagement element has a cable-receiving pathway extending therethrough for reception of the free end of the cable and selective securement thereof to create a cable loop between the cable attachment point and the cable lockout module, and the cable lockout module further having a base with a door connected thereto, the door movable between an opened position and a closed position in which the door provides access to the cable engagement element, the cable engagement element being operable whilst the door is in the opened position to receive the cable in the cable receiving pathway and to hold the cable even while the door remains in the opened position preventing the cable from being pulled in one direction under tension;
   wherein, when the door is in the closed position, the cable engagement element is securely covered by the door and the door is lockable relative to a remainder of the cable lockout module to prevent the door from being taken out of the closed position while locked;
   wherein truncated teeth on the door in conjunction with openings on a peripheral wall of the base of the cable lockout module define a cable entrance opening and a cable exit opening.

2. The lockout device of claim 1, wherein the cable attachment point and the cable lockout module are positioned on different external sides of the cover such that the internal cavity of the cover is interposed between the cable attachment point and the cable lockout module.

3. The lockout device of claim 1, wherein the opening about the internal cavity of the cover has an insert positioned therein, the insert being positioned about a periphery of the opening.

4. The lockout device of claim 3, wherein the insert is made from a material that is more compressible than a material of the cover.

5. The lockout device of claim 4, wherein the insert is configured to conform to parts of the valve, the valve stem, or the other control or a pipe associated therewith when the lockout device is attached thereto.

6. The lockout device of claim 1, wherein the cable engagement element includes a pair of rotatable cleats having the cable-receiving pathway therebetween.

7. The lockout device of claim 6, wherein the pair of rotatable cleats both have tips biased toward the cable-receiving pathway.

8. The lockout device of claim 6, wherein, when the cable is received in the cable-receiving pathway between the pair of rotatable cleats, the cable is able to be pulled in one direction to reduce a size of the cable loop formed between the cable attachment point and the cable lockout module but is not able to be pulled in the opposite direction to increase the size of the cable loop.

9. The lockout device of claim 6, wherein each of the pair of rotatable cleats is biased by a respective torsion spring.

10. The lockout device of claim 6, wherein the peripheral walls surround the cable engagement element wherein the pair of rotatable cleats are positioned between the cable entrance opening and the cable exit opening.

11. The lockout device of claim 10, wherein the cable exit opening is positioned at an upper end of the peripheral walls and the cable entrance opening is positioned at a lower end of the peripheral walls that opposes the upper end, and the pair of rotatable cleats are interposed between the cable entrance opening at the lower end of the peripheral walls and the cable exit opening at the upper end of the peripheral walls.

12. The lockout device of claim 1, wherein the cable attachment point includes a cable opening sized so that the free end of the cable is able to pass through the cable opening, but the securable end of the cable is too large to pass through the cable opening thereby permitting the cable to be secured to the cover by the engagement of the securable end with the cable opening of the cable attachment point.

13. The lockout device of claim 1, wherein the door is hinged relative to the remainder of the cable lockout module.

14. The lockout device of claim 1, wherein the cable lockout module has a tab with a plurality of lock openings and the door has a slot for receiving the tab when the door is in the closed position.

15. The lockout device of claim 14, wherein, when the door is in the closed position, the plurality of lock openings is on a side of the door opposite the cable engagement element.

16. The lockout device of claim 14, wherein the plurality of lock openings is sized to receive a shackle of a padlock to lock the door in the closed position.

17. The lockout device of claim 1, wherein the peripheral walls surround the cable engagement element and the cable entrance opening and the cable exit opening accommodate passage of the cable therethrough.

18. A method of attaching the lockout device of claim 1 to the valve, the valve stem, or other control to lock out the valve, the valve stem, or other control, the method comprising:
   placing the internal cavity of the cover over at least part of the valve, the valve stem, or other control;
   wrapping the free end of the cable around either the valve, a valve associated with the valve stem, or other control, or an associated pipe therewith; and
   placing the free end of the cable within the cable-receiving pathway of the cable engagement element to form the cable loop.

19. The method of claim 18, further comprising the steps of:
   closing the door of the cable lockout module; and
   locking the door in the closed position to prevent a removal of the free end of the cable from the cable-receiving pathway of the cable engagement element and thereby preventing the cable loop from being broken.

20. The method of claim 19, further comprising the step of pulling the cable through the cable-receiving pathway of the cable engagement element to reduce the size of the cable loop.

21. A lockout device for securing a valve, a valve stem, or other control, the lockout device comprising:
   a cover having an internal cavity and an opening about the internal cavity, the internal cavity for receiving at least a part of the valve, the valve stem, or the other control;
   a cable extending from a securable end to a free end, the cable being flexible;
   a cable attachment point attached to the cover, the cable being attached at the securable end of the cable to the cable attachment point; and
   a cable lockout module attached to the cover, the cable lockout module including a cable engagement element contained therewithin in which the cable engagement element has a cable-receiving pathway extending therethrough for reception of the free end of the cable and selective securement thereof to create a cable loop between the cable attachment point and the cable lockout module, and the cable lockout module further having a door movable between an opened position and a closed position in which the door provides access to the cable engagement element, the cable engagement element being operable whilst the door is in the opened position to receive the cable in the cable receiving pathway and to hold the cable even while the door remains in the opened position preventing the cable from being pulled in one direction under tension;
   wherein, when the door is in the closed position, the cable engagement element is securely covered by the door and the door is lockable relative to a remainder of the cable lockout module to prevent the door from being taken out of the closed position while locked;
   wherein the cable-receiving pathway extends between a cable entrance opening and a cable exit opening in which the cable-receiving pathway extends from the cable entrance opening at a lower end of a peripheral wall of a base of the cable lockout module, between a pair of rotatable cleats as the cable engagement element, and to the cable exit opening at an upper end of the peripheral wall of the base.

* * * * *